United States Patent
Park et al.

(10) Patent No.: US 11,444,341 B2
(45) Date of Patent: Sep. 13, 2022

(54) APPARATUS FOR DEGASSING BATTERY CELL

(71) Applicant: SK Innovation Co., Ltd., Seoul (KR)

(72) Inventors: Sun Min Park, Daejeon (KR); Dong Ju Kim, Daejeon (KR); Ji Won Na, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 17/149,787

(22) Filed: Jan. 15, 2021

(65) Prior Publication Data

US 2021/0257683 A1     Aug. 19, 2021

(30) Foreign Application Priority Data

Feb. 14, 2020 (KR) .......................... 10-2020-0018469

(51) Int. Cl.
     *H01M 10/52*      (2006.01)
     *H01M 10/04*      (2006.01)
     *H01M 50/317*      (2021.01)

(52) U.S. Cl.
     CPC .......... *H01M 10/52* (2013.01); *H01M 10/04* (2013.01); *H01M 50/317* (2021.01)

(58) Field of Classification Search
     CPC ...... H01M 10/50; H01M 10/52; H01M 10/04; H01M 10/12
     See application file for complete search history.

(56) References Cited

U.S. PATENT DOCUMENTS

| | | | |
|---|---|---|---|
| 2,862,986 A * | 12/1958 | Strauss | H01M 10/34 429/50 |
| 5,645,953 A * | 7/1997 | Kim | H01M 10/345 429/48 |
| 10,873,065 B2 | 12/2020 | Park et al. | |

FOREIGN PATENT DOCUMENTS

| | | |
|---|---|---|
| CN | 105552441 A | 5/2016 |
| EP | 2876724 A1 | 5/2015 |
| EP | 3474363 A1 | 4/2019 |
| KR | 1020030062511 A | 7/2003 |
| KR | 1020190055585 A | 5/2019 |
| KR | 1020190055595 A | 5/2019 |
| WO | 2016021066 A1 | 2/2016 |

OTHER PUBLICATIONS

Machine Translation of: CN 105552441, Dong et al., May 4, 2016.*

* cited by examiner

*Primary Examiner* — Kenneth J Douyette
(74) *Attorney, Agent, or Firm* — The Webb Law Firm (57) ABSTRACT

An apparatus for degassing a battery cell includes: a gas suction portion providing negative pressure; a first tubular member connected to the gas suction portion, and having at least one suction port formed in a radial direction; a second tubular member connected to the gas suction portion, and provided to be coupled to the first tubular member; and a hemispherical cover coupled to the first tubular member and the second tubular member, respectively, wherein the hemispherical cover includes a first cover coupled to the first tubular member and a second cover coupled to the second tubular member, when the first tubular member and the second tubular member and are coupled, the first cover and the second cover may be disposed such that openings face each other, and the suction port may be disposed between the first cover and the second cover.

10 Claims, 7 Drawing Sheets

APPARATUS FOR DEGASSING BATTERY CELL

CROSS-REFERENCE TO RELATED APPLICATION

This application claims priority to Korean Patent Application No. 10-2020-0018469 filed Feb. 14, 2020, the disclosure of which is hereby incorporated by reference in its entirety.

BACKGROUND OF THE INVENTION

1. Field of the Invention

The present disclosure relates to an apparatus for degassing a battery cell.

2. Description of Related Art

Unlike primary batteries, secondary batteries such as battery cells can be charged and discharged, and thus can be applied to devices within various fields such as digital cameras, mobile phones, notebook computers and hybrid vehicles. Examples of secondary batteries may include nickel-cadmium batteries, nickel-metal hydride batteries, nickel-hydrogen batteries, lithium secondary batteries, and the like.

In general, such a secondary battery is formed by stacking a cathode, a separator, and an anode. Materials thereof are selected in consideration of battery life, charge/discharge capacity, temperature characteristics, stability, and the like.

Secondary batteries are classified into pouch type, can type, and others, depending on a material of a case accommodating an electrode assembly. The pouch type accommodates an electrode assembly in a pouch formed of a flexible polymer material having a non-uniform shape. The can type accommodates an electrode assembly in a case formed of a material such as metal or plastic having a uniform shape.

A pouch, a case of a pouch-type secondary battery, is made of an exterior material having a flexible material.

A pouch-type secondary battery requires a process of removing gas (degassing) formed in an internal space of the pouch during a manufacturing process.

In the prior art, gas has been removed after disposing a battery cell in a separately manufactured chamber, but this method has a problem, in that productivity may be significantly low.

Therefore, there is a need for a gas removing apparatus for improving productivity.

SUMMARY OF THE INVENTION

An aspect of the present disclosure is to provide an apparatus for degassing a battery cell capable of improving productivity.

According to an aspect of the present disclosure, an apparatus for degassing a battery cell includes: a gas suction portion providing negative pressure; a first tubular member connected to the gas suction portion and having at least one suction port formed in a radial direction; a second tubular member connected to the gas suction portion and provided to be coupled to the first tubular member; and a hemispherical cover coupled to the first tubular member and the second tubular member, respectively, wherein the hemispherical cover includes a first cover coupled to the first tubular member and a second cover coupled to the second tubular member, and when the first tubular member and the second tubular member are coupled, the first cover and the second cover may be disposed so that openings face each other, and the suction port may be disposed between the first cover and the second cover.

In the present embodiment, an end of the first tubular member may be formed sharply.

In the present embodiment, the first tubular member may penetrate a gas chamber and be coupled to the second tubular member, and the hemispherical cover may be in close contact with an exterior material forming the gas chamber and may block an internal space of the gas chamber from an external space of the gas chamber.

In the present embodiment, when the first tubular member penetrates through the gas chamber and is coupled to the second tubular member, the suction port may be disposed inside the gas chamber.

In the present embodiment, the hemispherical cover may be disposed such that a plane on which the opening is disposed is perpendicular to a length direction of the first tubular member or the second tubular member.

In the present embodiment, a close contact pad attached to the opening of the hemispherical cover may be further included.

In the present embodiment, a suction pipe respectively connecting the first tubular member and the second tubular member to the gas suction portion, may be further included.

In the present embodiment, an outer diameter of the end of the first tubular member may be formed to be equal to or smaller than an inner diameter of an end of the second tubular member.

In the present embodiment, the end of the first tubular member may be inserted into the second tubular member and may be coupled to the second tubular member.

In the present embodiment, when the second tubular member is coupled to the first tubular member, an internal space of the second tubular member may be connected to the internal space of the first tubular member.

In the present embodiment, the end of the second tubular member may be disposed in the second cover.

BRIEF DESCRIPTION OF THE DRAWINGS

The above and other aspects, features and other advantages of the present disclosure will be more clearly understood from the following detailed description taken in conjunction with the accompanying drawings, in which.

DESCRIPTION OF THE INVENTION

Hereinafter, exemplary embodiments of the present disclosure will be described in detail with reference to the accompanying drawings. The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals. Through the specification, terms, such as "above," "upper," "below," and "lower" and the like, may be used herein for ease of description to describe one element's relationship to another element(s) as shown in the figures.

It will be understood that the spatially relative terms are intended to encompass different orientations of the device in use or operation in addition to the orientation depicted in the figures.

Figure 1:
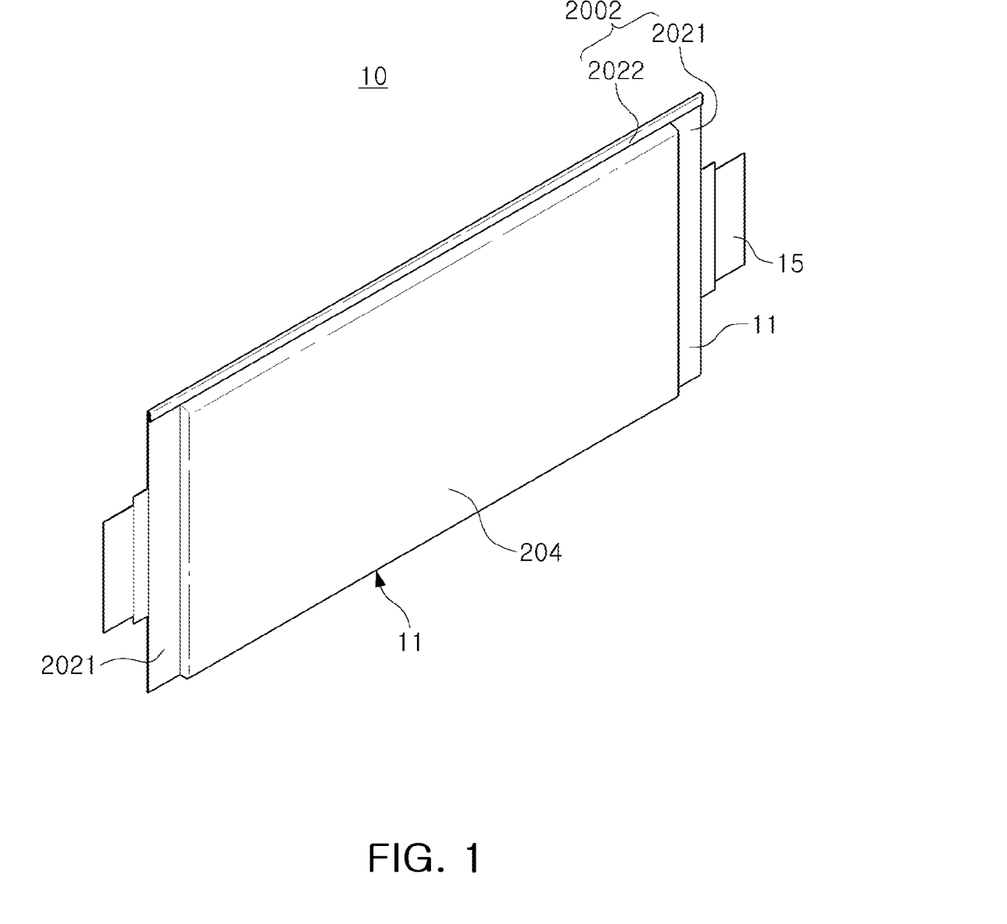
FIG. 1 is a perspective view schematically illustrating a battery cell according to an embodiment of the present disclosure.

FIG. 1 is a perspective view schematically illustrating a battery cell according to an embodiment of the present disclosure.

Referring to FIG. 1, a battery cell 10 may be configured in a form in which an electrode assembly (not shown) is accommodated in a pouch 11.

The electrode assembly includes a plurality of electrode plates and electrode tabs, and is accommodated in the pouch 11. Here, the electrode plate may be comprised of a positive electrode plate and a negative electrode plate, and the electrode assembly may be configured in a form in which the positive electrode plate and the negative electrode plate are stacked so that wide surfaces thereof face each other with a separator therebetween.

The positive electrode plate and the negative electrode plate may be formed as a structure in which an active material slurry is applied to a current collector, and the slurry may be formed by stirring a particulate active material, an auxiliary conductor, a binder, a plasticizer, and the like, in a state in which a solvent is added.

In addition, in the electrode assembly, a plurality of positive electrode plates and a plurality of negative electrode plates are stacked in a vertical direction. In this case, electrode tabs are provided on the plurality of positive electrode plates and the plurality of negative electrode plates, respectively, and may be connected to the same electrode lead 15 through each thereof having the same polarity.

In the present embodiment, two electrode leads 15 are disposed to face in opposite directions.

The pouch 11 may be formed to have a container shape to provide an internal space in which an electrode assembly and an electrolyte (not shown) are accommodated. In this case, the electrode lead 15 of the electrode assembly may be exposed to the outside of the pouch 11.

The pouch 11 may be divided into a sealing portion 202 and an accommodating portion 204.

The accommodating portion 204 is formed in a shape of a container to provide a square-shaped internal space. The electrode assembly and the electrolyte may be accommodated in the internal space of the accommodating portion 204.

The sealing portion 202 is a portion to which a portion of the pouch 11 is bonded to seal a periphery of the accommodating portion 204. Therefore, the sealing portion 202 is formed to have a flange shape extending outwardly of the accommodating portion 204 formed in a container shape, and thus the sealing portion 202 may be disposed along an outer periphery of the accommodating portion 204.

A thermal fusion method may be used for bonding the pouch 11, but an example thereof is not limited thereto.

In addition, in the present embodiment, the sealing portion 202 may be divided into a first sealing portion 2021 on which an electrode lead 15 is disposed and a second sealing portion 2022 on which the electrode lead 15 is not disposed.

In the present embodiment, the pouch 11 is formed using a single exterior material. More specifically, the pouch 11 may be completed by forming one or two accommodating portions on one external material and then folding the external material so that the accommodating portions form one space (i.e., an accommodating portion).

In the present embodiment, the accommodating portion 204 may be formed in a square shape. In addition, a sealing portion 202 formed by bonding an exterior material may be provided on an outer periphery of the accommodating portion 204. However, as described above, it is not necessary to form the sealing portion 202 on a surface on which the exterior material is folded. Therefore, in the present embodiment, the sealing portion 202 is formed on the outer periphery of the accommodating portion 204, provided only on three surfaces of the accommodating portion 204, and the sealing portion 202 may not be formed on any one surface (a lower surface in FIG. 3) of the outer peripheries of the accommodating portion.

In the present embodiment, since the electrode lead 15 are disposed to face opposite directions, the two electrode leads 15 may be disposed in the sealing portion 202 formed on different sides. Therefore, the sealing portion 202 of the present embodiment may be composed of two first sealing portions 2021 in which the electrode lead 15 is disposed, and one second sealing portion 2022 in which the electrode lead 15 is not disposed.

The battery cell 10 configured as described above may be a battery capable of charging and discharging, and specifically, may be a lithium ion (Li-ion) battery or a nickel metal hydride (Ni-MH) battery.

Figure 2:
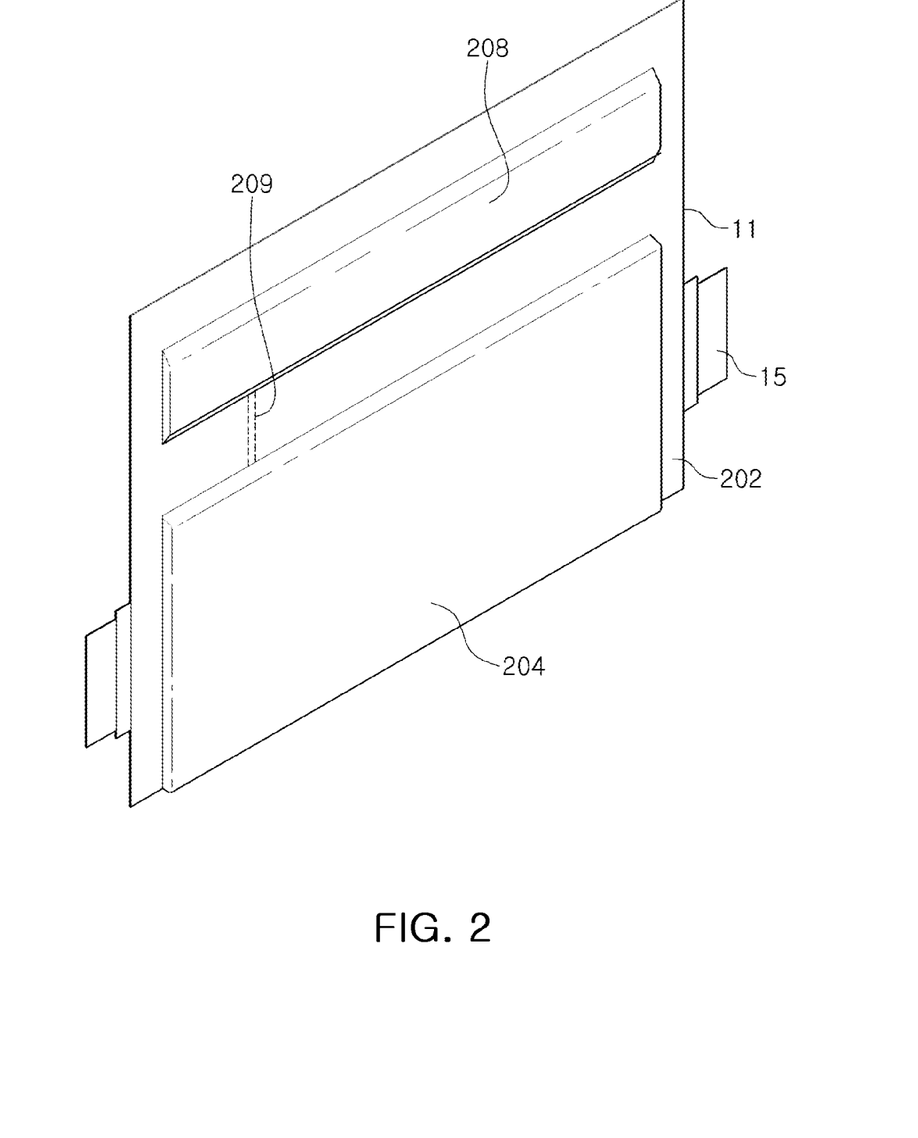
FIG. 2 is a diagram schematically illustrating a state prior to removing a gas chamber in a process of manufacturing the battery cell of FIG. 1.

FIG. 2 is a view schematically illustrating a state before removing a gas chamber in the process of manufacturing the battery cell of FIG. 1.

In the process of the pouch-type battery cell 10 described above, as shown in FIG. 2, the accommodating portion 204 in which an electrode assembly is disposed and the gas chamber 208 in which gas generated from the accommodating portion 204 is collected may be provided inside a pouch 11, which is an exterior material. Here, the gas chamber 208 is a space, and may be a portion, which is finally removed, after gas is all removed.

Therefore, a gas passage portion 209 for moving the gas of the accommodating portion 204 to the gas chamber 208 may be provided between the accommodating portion 204 and the gas chamber 208.

When the gas generated in the accommodating portion 204 moves to the gas chamber 208, gas of the gas chamber 208 may be removed using a gas removal apparatus 100 according to the present embodiment.

Figure 3:
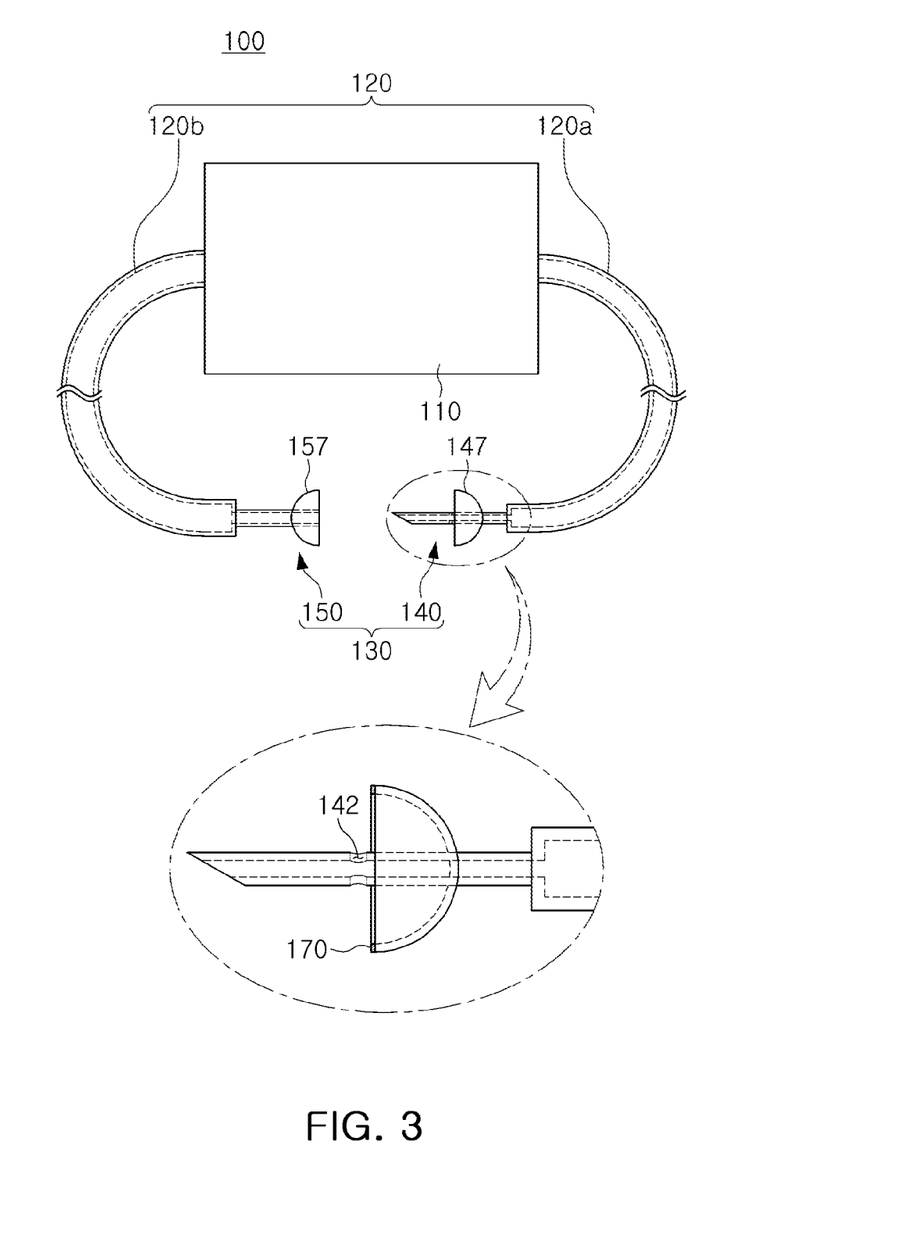
FIG. 3 is a diagram schematically illustrating an apparatus for degassing a battery cell according to an embodiment of the present disclosure.

FIG. 3 is a view schematically illustrating a gas removal apparatus according to an embodiment of the present disclosure.

Referring to FIG. 3, the gas removal apparatus 100 according to the present embodiment, may include a gas suction portion 110, a suction pipe 120, and a through member 130. The gas suction portion 110 may provide negative pressure to suction gas into the suction pipe 120 and the through member 130. Therefore, as the gas suction portion 110, various devices may be used as long as a device capable of suctioning gas and maintaining the inside of the suction pipe 120 at negative pressure is provided.

One end of the suction pipe 120 may be connected to the gas suction portion 110, and the other end thereof may be connected to the through member 130. Therefore, the suction pipe 120 may be configured in various forms as long as gas suctioned from the through member 130 is transmitted to the gas suction portion 110 without leakage.

In the present embodiment, the suction pipe 120 may include a first pipe 120a connected to the first tubular member 140 and a second pipe 120b connected to the second tubular member 150.

The through member 130 may be coupled to an end portion of the suction pipe 120, and be inserted into the gas chamber 208 described above to suction the gas inside the gas chamber 208.

To this end, the through member 130 may include a first tubular member 140 and a second tubular member 150 coupled to each other.

Both the first tubular member 140 and the second tubular member 150 may have an empty tubular body. In addition, in the present embodiment, at least a portion of the first tubular member 140 may be inserted into the second tubular member 150.

To this end, an outer diameter of the end of the first tubular member 140 may be formed to be equal to or smaller than an inner diameter of the end of the second tubular member 150. However, the present disclosure is not limited thereto, and various modifications such as configuring that the second tubular member 150 is inserted into the first tubular member 140, or the ends of the first tubular member 140 and the second tubular member 150 are engaged with each other, or the like, may be made.

The end of the first tubular member 140 may be formed sharply so that the first tubular member 140 may be easily inserted into the second tubular member 150.

The first tubular member 140 may include at least one suction port 142.

The suction port 142 is formed on a side surface of the first tubular member 140, and is formed in a form of a through hole in a radial direction of the first tubular member 140. Accordingly, the internal space of the first tubular member 140 may be connected to the outside through the suction port 142.

The plurality of suction ports 142 may be disposed along an outer peripheral surface of the first tubular member 140.

Such suction port 142 may be inserted and disposed in the gas chamber 208 and used as an inlet for suctioning gas. Accordingly, the suction port 142 may be formed to have a size smaller than the thickness of the gas chamber 208 so that it can be completely inserted into the gas chamber 208.

When the suction port is disposed at the end of the first tubular member 140, if the volume of the gas chamber 208 is reduced in the process of removing gas from the gas chamber 208, the suction port may be blocked due to the exterior material, so it is difficult to remove the gas smoothly supplied.

However, when the suction port 142 is formed in a radial direction of the through member 130 as in the present embodiment, even if the volume of the gas chamber 208 is reduced, the exterior material is difficult to block the suction port 142, so that gas can be effectively removed.

When the first tubular member 140 is completely coupled to the second tubular member 150, the suction port 142 may not be inserted into the second tubular member 150 and be located outside the second tubular member 150. Therefore, even if the first tubular member 140 is coupled to the second tubular member 150, gas can be continuously suctioned.

In addition, the through member 130 according to the present embodiment may include hemispherical covers 147 and 157.

The hemispherical covers 147 and 157 may include a first cover 147 provided on the first tubular member 140 and a second cover 157 provided on the second tubular member 150. The first cover 147 and the second cover 157 may be disposed such that openings face each other when the first tubular member 140 and the second tubular member 150 are coupled.

In addition, when the first tubular member 140 and the second tubular member 150 are completely coupled, and the opening of the first cover 147 and the opening of the second cover 157 are disposed to be very adjacent, the two hemispherical covers 147 and 157 may have a spherical shape as a whole.

The hemispherical covers 147 and 157 may have an opening in close contact with the outer surface of the gas chamber 208 when the through member 130 is inserted and disposed in the gas chamber 208. Accordingly, since the internal space of the gas chamber 208 is completely blocked from external environments by the hemispherical covers 147 and 157, the gas located inside the gas chamber 208 and the hemispherical covers 147 and 157 may only be removed through the suction port 142.

To this end, the hemispherical cover 147. 157 may be disposed such that a plane on which the opening is disposed is perpendicular to the length direction of the first tubular member 140 or the second tubular member 150.

In addition, in the present embodiment, the first tubular member 140 and the second tubular member 150 are disposed at the center of the opening of the hemispherical cover 147. 157, but the configuration of the present disclosure is not limited thereto.

In the hemispherical shape, the pressure is not concentrated in a specific location and is evenly distributed entirely. Therefore, in the case of configuring the covers 147 and 157 in a hemispherical shape as in the present embodiment, even if the pressure inside the gas chamber 208 is lowered, it is possible to suppress the deformation or damage of the hemispherical covers 147 and 157 due to pressure changes.

In the present embodiment, since the first tubular member 140 is configured to penetrate through the gas chamber 208, a certain portion may be disposed to protrude from the first cover 147. A distance between the end of the first tubular member 140, disposed to protrude, and the first cover 147 may be formed to be longer than the thickness of the gas chamber 208.

Meanwhile, when an opening of the first cover 147 and the suction port 142 are disposed on the same plane, the entire suction port 142 cannot enter an interior of the gas chamber 208 due to the thickness of the exterior material. Accordingly, in the present embodiment, the suction port 142 may be disposed to be spaced apart from a plane in which the opening of the first cover 147 is disposed. More specifically, the suction port 142 may be spaced apart from the plane formed by the opening of the first cover 147 toward the end of the first tubular member 140 by a distance equal to or greater than the thickness of the exterior material.

In addition, in the present embodiment, the end of the second tubular member 150 is not inserted into the gas chamber 208. Therefore, the end of the second tubular member 150 may be disposed on the same plane as the opening of the second cover 157 so that the opening of the second cover 157 can be firmly adhered to the outer surface of the gas chamber 208, or may be disposed in the internal space of the second cover 157.

In addition, a close contact pad 170 may be attached to a surface in contact with the gas chamber 208 at the openings of the hemispherical covers 147 and 157. The close contact pad 170 has an elastic restoring force like rubber, and may be formed of a material capable of sealing between the hemispherical covers 147 and 157 and the pouch 11.

Therefore, the close contact pad 170 can increase the sealing force between the internal space of the hemispherical cover 147, 157 and the pouch 11 forming the gas chamber 208, and thus, it can block the outflow or inflow or gas or air between the hemispherical covers 147, 157 and the pouch.

Subsequently, an operation of the gas removal apparatus 100 according to the present embodiment will be described.

Figure 4:
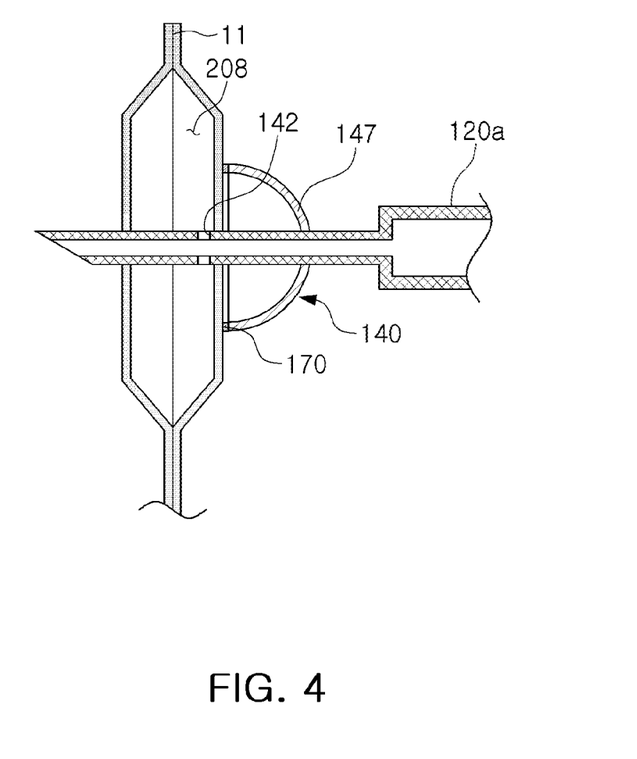
FIGS. 4 to 7 are views for explaining an operation of the apparatus for degassing a battery cell according to the present embodiment.
Figure 5:
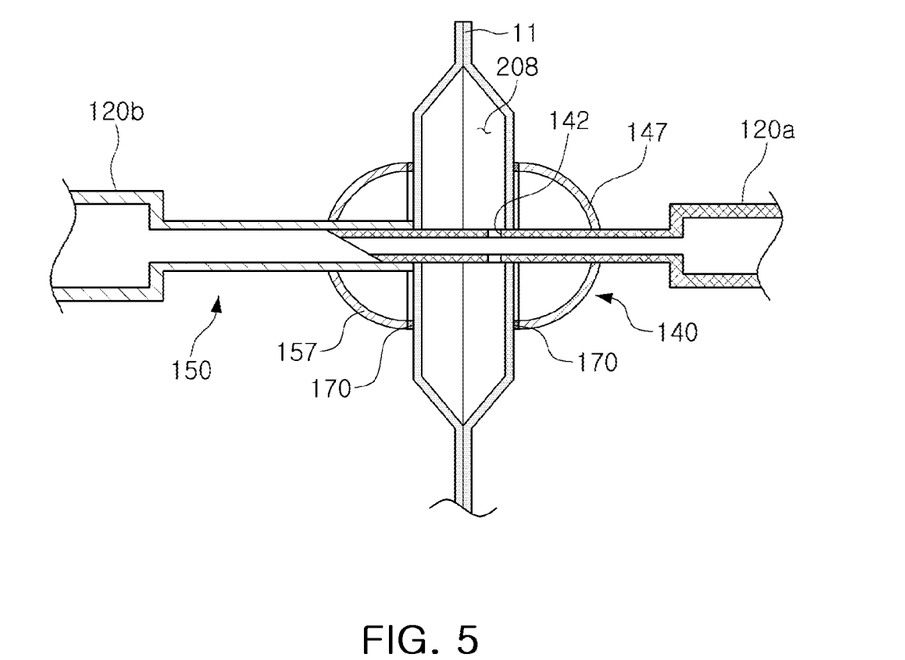
Figure 6:
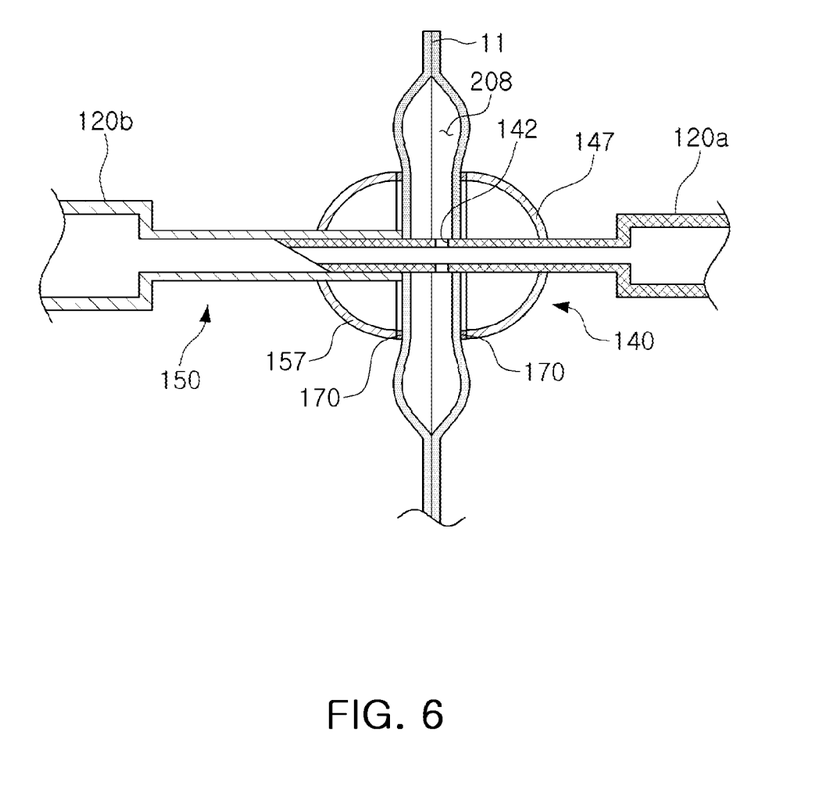

FIGS. 4 to 6 are views for explaining the operation of the gas removal apparatus according to the present embodiment.

First, as shown in FIG. 4, when a gas chamber 208 is filled with gas, a first tubular member 140 is inserted into the gas chamber 208.

As described above, since the end of the first tubular member 140 is sharply formed, the first tubular member 140 can easily cut an exterior material and may be inserted into the gas chamber 208.

In the present step, the first tubular member 140 may completely penetrate through the gas chamber 208, and thus the end of the first tubular member 140 may be disposed outwardly of the gas chamber 208.

Subsequently, as shown in FIG. 5, the end of the first tubular member 140 is inserted into the second tubular member 150, and the first tubular member 140 and the second tubular member 150 are coupled. Accordingly, an internal space of the second tubular member 150 may be connected to an internal space of the first tubular member 140.

The first tubular member 140 and the second tubular member 150 may be coupled until the hemispherical covers 147 and 157 contact an outer surface of the gas chamber 208 and are in close contact with the pouch 11.

Accordingly, the suction port 142 of the first tubular member 140 may be disposed inside the gas chamber 208, and an internal space of the gas chamber 208 may be blocked from the outside by the hemispherical covers 147 and 157.

In this process, the first tubular member 140 and the second tubular member 150 may be pressed toward each other with a predetermined force. Here, the predetermined force described above refers to a force capable of maintaining adhesion between the pouch 11 and the hemispherical covers 147 and 157.

Subsequently, the gas inside the gas chamber 208 is suctioned through the gas suction part 110. As the gas suction portion 110 is driven, negative pressure is generated in the suction pipe 120, and thus the gas located inside the gas chamber 208 may be suctioned into the gas suction portion 110 through the suction port 142 and the suction pipe 120.

In this process, gas or air disposed in the hemispherical covers 147 and 157 may also be moved into the gas chamber 208 through a hole formed in the pouch 11 of the gas chamber 208 by the first tubular member 140. Then, it may be suctioned through the suction port 142.

Figure 7:
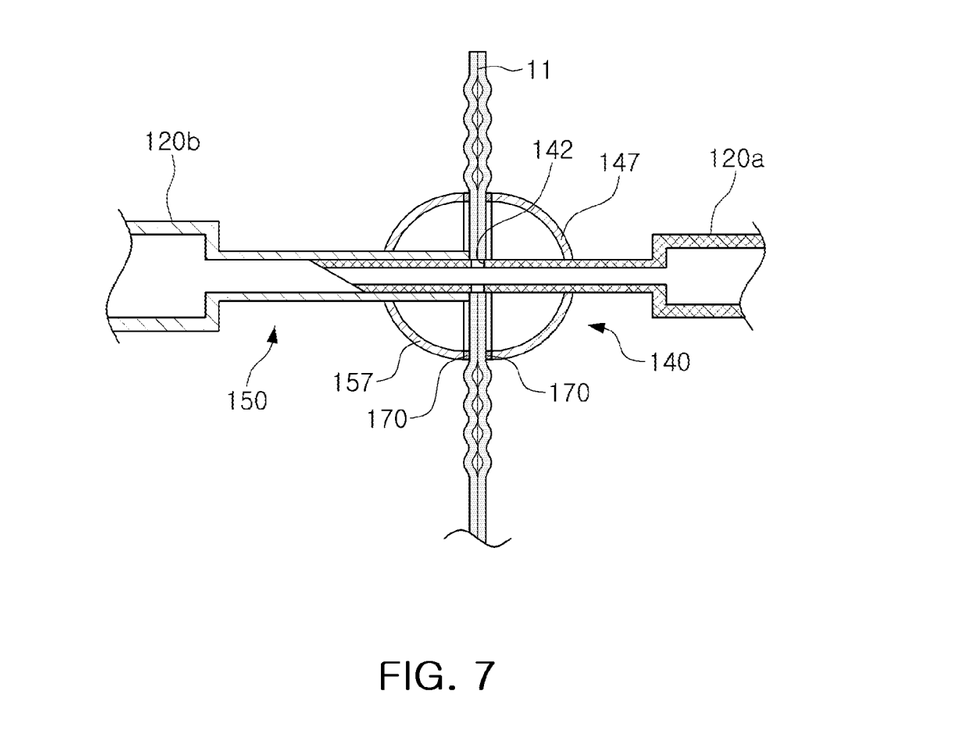

Meanwhile, as shown in FIGS. 6 and 7, as the gas in the gas chamber 208 is removed, a gap between exterior materials forming the gas chamber 208 may be reduced. However, as described above, since the first tubular member 140 and the second tubular member 150 are pressed against each other with a predetermined force, and when the gap between the exterior materials is reduced, the gap between the first cover 147 and the second cover is also reduced. Accordingly, adhesion between the pouch 11 and the hemispherical covers 147 and 157 may be continuously maintained.

In addition, as the gas in the gas chamber 208 is removed, external pressure becomes greater than internal pressure of the hemispherical covers 147 and 157. Therefore, as the gas is removed, the hemispherical covers 147 and 157 of the present embodiment may be in close contact with the external material due to pressure difference described above. Therefore, in the process of removing gas, a gap is formed between the exterior material and the hemispherical covers 147 and 157 to prevent external air from flowing into the gas chamber 208.

Further, as shown in FIG. 7, the suction port 142 is located in the gas chamber 208 until the end when gas is removed. In addition, since the suction port 142 is formed in a radial direction of the through member 130, even if the volume of the gas chamber 208 is reduced, the suction port 142 is not blocked by the exterior material. Therefore, even if the size of the gas chamber 208 becomes very small as the gas is removed, the gas in the gas chamber 208 may be effectively removed through the suction port 142 located in the gas chamber 208 and hemispherical covers 147 and 157.

When all the gas in the gas chamber 208 is removed, a gas passage portion 209 connecting the gas chamber 208 and the accommodating portion 204 is blocked, and then the gas chamber 208 is removed to complete the battery cell 10.

The gas passage portion 209 may be blocked by bonding the exterior material to each other through a method such as thermal fusion, or the like, but an example thereof is not limited thereto.

In an embodiment, the gas removal apparatus may include a plurality of through members 130. For example, gas may be removed by simultaneously coupling the plurality of through members 130 to one gas chamber 208.

In addition, in an embodiment, in the gas removal apparatus, the plurality of through members 130 may have different diameters. In this case, the through member 130 may be selectively used according to the size of the gas chamber 208.

Since the gas removing apparatus according to the present embodiment described above does not need to position the gas chamber 208 in the chamber as in the prior art, it is possible to minimize a size of a facility for removing gas. In addition, since a process of disposing or removing the gas chamber 208 inside the chamber can be omitted, process time may also be shortened.

In addition, the suction port 142 for suctioning gas is disposed inside the gas chamber 208 and the hemispherical covers 147 and 157 are disposed outside the gas chamber 208 to block external air from entering the gas chamber 208. Accordingly, as the gas in the gas chamber 208 is removed, even if the pouches 11 forming the gas chamber 208 are close to each other, the remaining gas can be effectively removed.

Further, since hemispherical covers 147 and 157 are used, the hemispherical covers 147 and 157 can be prevented from being deformed even if internal pressure of the hemispherical covers 147 and 157 is lowered, the hemispherical covers 147 and 157 may be separated or separated from the pouch 11 to prevent external air from flowing into the gas chamber 208 during the gas removing apparatus.

The battery cell manufactured using the gas removal apparatus described above can be used not only as a power source for small devices, but also as unit cells for medium or large battery modules.

Further, in the present disclosure a battery pack including the above-described battery module as a power source for a medium or large-sized device. The above-described medium or large-sized device may include an electric vehicle, a power storage device, and the like, including an electric vehicle (EV), a hybrid electric vehicle (HEV), a plug-in hybrid electric vehicle (PHEV), and the like, but an example the present disclosure is not limited thereto.

As set forth above, according to an embodiment of the present disclosure, since a gas removal apparatus does not need to be located in a gas chamber, as in the prior art, it is possible to minimize a size of a facility for removing gas. In addition, since a process of disposing the gas chamber inside the chamber can be omitted, process time can also be shortened.

In addition, as gas in the gas chamber is removed, external pressure becomes greater than internal pressure of a hemispherical cover, so that the hemispherical cover of the present embodiment adheres to an exterior material as the gas is removed. Therefore, in the process of removing the gas, a gap is generated between the exterior material and the hemispherical cover, thereby preventing external air from flowing into the gas chamber.

Further, since a suction port is located in the gas chamber until the end of a process, even if the size of the gas chamber becomes very small as the gas is removed, the gas in the gas chamber can be effectively removed through the suction port and the hemispherical cover located in the gas chamber.

In addition, since the suction port is formed in a radial direction of a through member, even if a volume of the gas chamber is reduced, there is no clogging of the suction port, so that gas can be effectively removed.

While example embodiments have been shown and described above, it will be apparent to those skilled in the art that modifications and variations could be made without departing from the scope of the present inventive concept as defined by the appended claims.

What is claimed is:

1. An apparatus for degassing a battery cell, comprising:
a gas suction portion providing negative pressure;
a first tubular member connected to the gas suction portion, and having at least one suction port formed in a form of a through hole a radial direction of the first tubular member;
a second tubular member connected to the gas suction portion, and provided to be coupled to the first tubular member; and
a hemispherical cover coupled to the first tubular member and the second tubular member, respectively,
wherein the hemispherical cover comprises a first cover coupled to the first tubular member and a second cover coupled to the second tubular member,
wherein, when the first tubular member and the second tubular member are coupled, the first cover and the second cover are disposed such that openings face each other, and the suction port is disposed between the first cover and the second cover,
wherein the first tubular member penetrates through a gas chamber of the battery cell and is coupled to the second tubular member, and
wherein, when the first tubular member penetrates through the gas chamber and is coupled to the second tubular member, the suction port is disposed inside the gas chamber.

2. The apparatus for degassing a battery cell of claim 1, wherein an end of the first tubular member is formed sharply.

3. The apparatus for degassing a battery cell of claim 1, wherein
the hemispherical cover is in close contact with an exterior material forming the gas chamber to block an internal space of the gas chamber from an external space of the gas chamber.

4. The apparatus for degassing a battery cell of claim 1, wherein the hemispherical cover is disposed such that a plane on which the opening is disposed is perpendicular to a length direction of the first tubular member or the second tubular member.

5. The apparatus for degassing a battery cell of claim 1, further comprising a close contact pad attached to the opening of the hemispherical cover.

6. The apparatus for degassing a battery cell of claim 1, further comprising a suction pipe connecting the first tubular member and the second tubular member to the gas suction portion, respectively.

7. The apparatus for degassing a battery cell of claim 1, wherein an outer diameter of an end of the first tubular member is formed to be equal to or smaller than an inner diameter of an end of the second tubular member.

8. The apparatus for degassing a battery cell of claim 1, wherein an end of the first tubular member is inserted inside the second tubular member and is coupled to the second tubular member.

9. The apparatus for degassing a battery cell of claim 1, wherein when the second tubular member is coupled to the first tubular member, an internal space of the second tubular member is connected to an internal space of the first tubular member.

10. The apparatus for degassing a battery cell of claim 1, wherein an end of the second tubular member is disposed in the second cover.

* * * * *